July 3, 1956
R. H. COTTON
2,752,727
EDUCATIONAL DEVICES
Filed Feb. 23, 1952
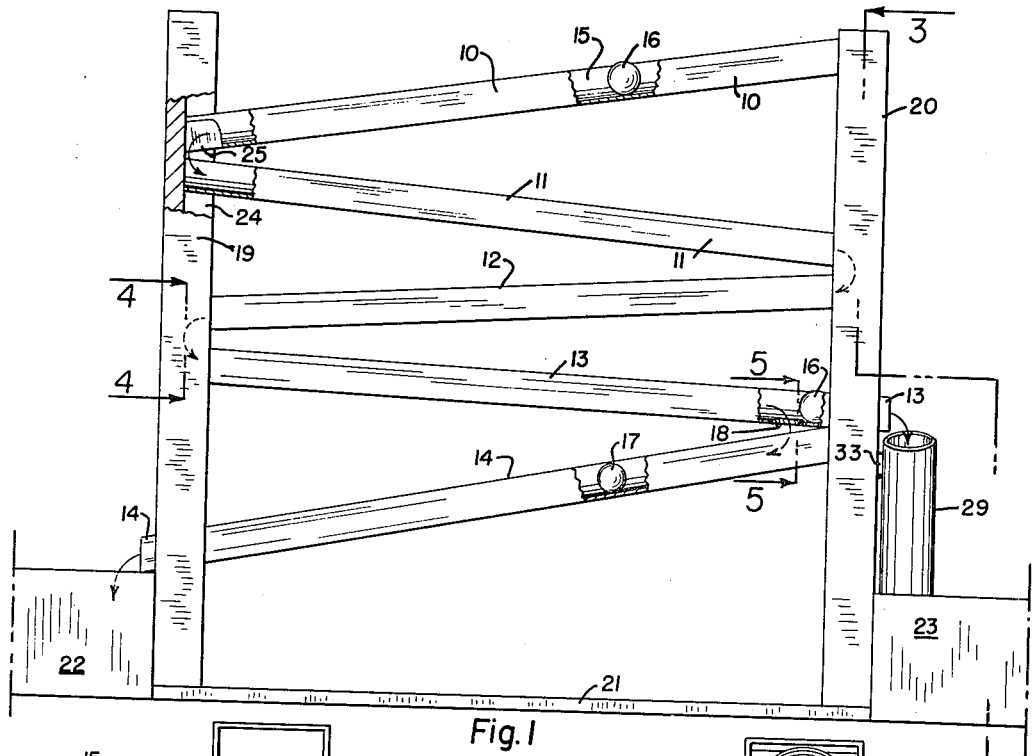
Fig. 1
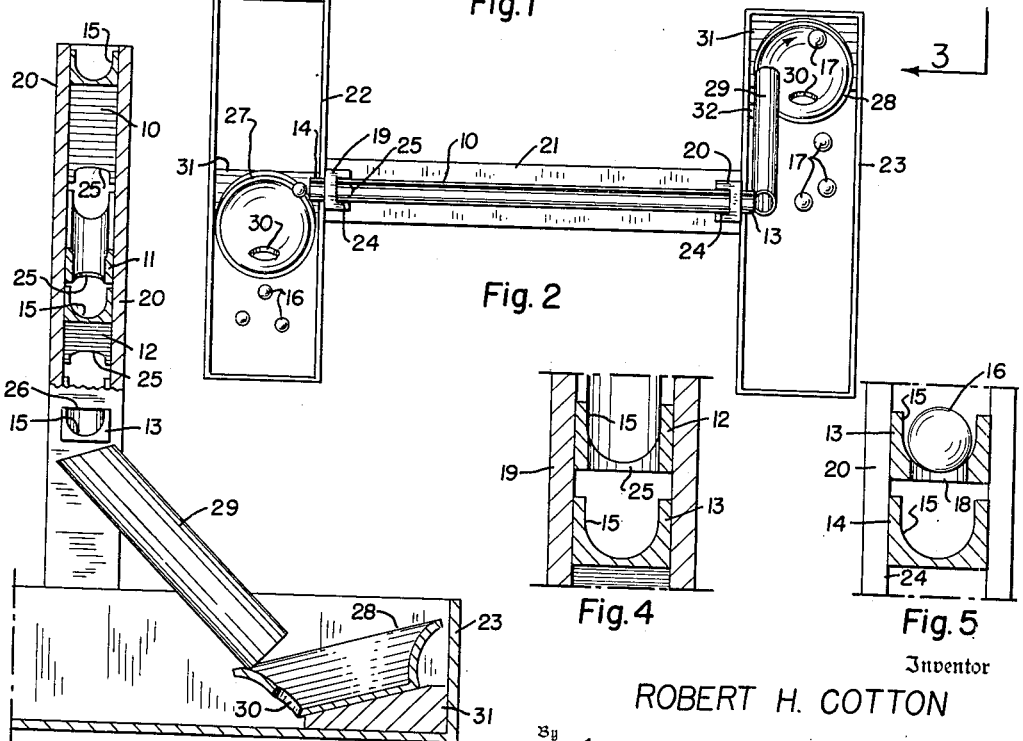
Fig. 2
Fig. 3
Fig. 4
Fig. 5
Inventor
ROBERT H. COTTON
By Lamphere and Van Valkenburgh
Attorneys

2,752,727

EDUCATIONAL DEVICES

Robert H. Cotton, Colorado Springs, Colo.

Application February 23, 1952, Serial No. 273,025

6 Claims. (Cl. 46—43)

This invention relates to educational devices, and more particularly to educational devices for children.

During the formative period of a child's early life, it is considered desirable to enable the child to learn not only coordination of this own movements, but also to cooperate with other children and coordinate his movements with those of other children. An educational device which enables one child, and preferably two children, to make certain movements which result in a pleasing effect, is more apt to be used by one or two children with enthusiasm, than a device which does not produce the excitement or appeal of such a result. It is also considered desirable to inculcate a competitive spirit in a child, and particularly a competitive spirit which depends at least partly on cooperation and coordination with another.

Among the objects of this invention are to provide a novel educational device; to provide such an educational device which is particularly adapted for use by children; to provide such a device which produces a result pleasing to the child or children; to provide such a device which requires effort, and more particularly coordination of physical effort, to produce a desired result; to provide such a device which may be utilized by two children, or two groups of children; to provide such a device which provides competition but also involves cooperation with others; and to provide such a device which is sufficiently simple in operation that the mental effort required is not unduly great.

From a practical view, of course, such a device should be capable of being made of comparatively inexpensive material, and also must be sufficiently simple and sturdy in construction that it will withstand rigorous use. Thus, such practical matters are also objects of the present invention.

Additional objects of this invention, and the novel features thereof, will become apparent from the description which follows, taken in connection with the accompanying drawing, in which:

Fig. 1 is a side elevation of an educational device constructed in accordance with this invention, with certain parts broken away to indicate more clearly a preferred construction thereof;

Fig. 2 is a top plan view, on a reduced scale, of the device of Fig. 1;

Fig. 3 is a vertical section, taken at one end of the device along the offset line 3—3;

Fig. 4 is a fragmentary vertical section, on an enlarged scale, taken along line 4—4 of Fig. 1; and Fig. 5 is another fragmentary vertical section, also on an enlarged scale, taken along line 5—5 of Fig. 1.

In accordance with this invention, an educational device adapted to accomplish the foregoing objectives is constructed so that two different sets of objects, more specifically round balls of different diameters, may be placed in any desired order in an upper position, as along a runway or the like, and will then move downwardly, such as back and forth along successive runways, then be automatically separated into groups according to size and eventually arrive at two spaced collecting points. Following separation, an additional movement, such as spinning about a circular or helical path, to contrast with the back and forth movement along the runways, is preferably produced prior to arrival at the collection points. Movement of the balls along the runways is preferably produced by the force of gravity, while the spinning effect is preferably enhanced by the kinetic energy of the balls as they leave the last runway.

The automatic separation of the balls near the end of the run, followed by the spinning, produces a pleasing effect, since the device is preferably so constructed that the users may observe its operation at all times.

To cause the device to continue in operation it is, of course, necessary for the children to remove the balls from the collecting points and replace them at the starting point or points, and coordination of movement is necessary to move the balls from a lower point of collection to a higher point of starting for another run. This enables a child to learn coordination of movement in picking up the balls, lifting them up and placing them at the higher starting point, and involves the necessity for holding on to the balls during movement and accurately depositing the balls at the starting point. Preferably, one child moves the smaller balls, while another child moves the larger balls. The necessity for moving as accurately and quickly as another child, in order to keep as many small balls as large balls, or vice versa, going through the device produces a spirit of competition. Nevertheless, since the most pleasing effect to many children is obtained when the balls substantially alternate, i. e. the first one going to one collection point and the next to the opposite collection point, a spirit of cooperation is also inculcated. Consequently, if a child handling the smaller balls, for instance, moves the ball more quickly or accurately than the child handling the larger balls, it often happens that the faster child will urge the slower child to a greater speed or accuracy in order that a more pleasing effect will be obtained.

An educational device adapted to operate in the foregoing manner is illustrated in the drawing, and preferably consists, as in Fig. 1, of a series of runways, such as an upper runway 10, intermediate runways 11, 12 and 13, and a lower runway 14, each of the runways being provided with a longitudinal, U-shaped groove 15. Grooves 15 are of a size to accommodate the larger balls 16 and therefore accommodate also the smaller balls 17, and the grooves 15 may have any desired cross-sectional contour, although a curved bottom is preferable, as in Figs. 4 and 5. Each of the runways 10 et seq. is inclined in alternate directions and at a suitable angle, such as 2° to 15° to the horizontal, with the upper runway 10 and the lower runway 14 inclined at a greater angle, such as 8° to 10°, and the intermediate runways 12, 13 and 14 at a lesser angle, such at 2° to 4°, to give the balls a better start down the upper runway 10 and the smaller balls 17 a greater impetus for subsequent spinning, down the lower runway 14. The intermediate runway 13, as in Figs. 1 and 5, is provided with a hole 18 through which the smaller balls 17 will fall, but over which the larger balls 16 will pass, thereby separating the balls.

The runways 10 et seq. may be mounted in any suitable manner, such as between two standards or uprights 19 and 20, in turn mounted on a base 21, and also attached to a receptacle 22 at one end of the base for receiving the smaller balls and a receptacle 23 at the opposite end, for receiving the larger balls. Each of standards 19 and 20 may be provided with a rectangular groove 24, extending vertically and longitudinally thereof, with the grooves facing each other, as will be evident from Fig. 2, to receive the ends of runways 10 et seq. The width of the runways 10 et seq. is preferably substantially equal to the width of the grooves 24 in the standards 19 and 20, so that the ends of the runways will fit into the grooves, for ready attachment thereto. The lower end of each of the runways 10, 11 and 12 is preferably provided with an opening or slot 25, as illustrated in Figs. 3 and 4, which will permit the balls to drop from each runway to the next lower runway, while the lower ends of the runways 13 and 14 extend to and preferably through the outer edges of the standards 19 and 20, the standards being provided with suitable holes 26, as in Fig. 3, to accommodate the respective runways.

As indicated by the arrows of Fig. 1, balls deposited in the groove 15 in the upper runway 10 will roll by gravity along the runway 10, drop through the slot 25 at the end thereof into the groove 15 of runway 11, and similarly back and forth along the runways 11, 12 and 13. As the balls reach the lower end of runway 13, the smaller balls will drop through the hole 18 onto the runway 14, while the larger balls will roll on to the end of the runway 13. The smaller balls, which drop through the hole 18, will of course roll to the lower end of runway 14 and drop toward the receptacle 22. To produce a motion of the balls which differs from the straight line or back and forth motion down the runways, to increase the interest of a child in the operation of the device, bowls 27 and 28 may be disposed in the respective receptacles 22 and 23, bowl 27 being conveniently disposed beneath and tangentially to the discharge end of runway 14 and bowl 28 spaced from the end of runway 13. The smaller balls will drop directly into the bowl 27 from the end of runway 12, while a guide tube 29 may be mounted angularly, as at 45°, with its upper end directly beneath the end of runway 13 and its lower end generally tangential and above bowl 28 at one edge thereof, as in Fig. 2. Bowls 27 and 28 may be identical in construction, although bowl 27 may be smaller, if desired, each bowl being mounted in a tipped position so that a hole 30 in one side but adjacent the bottom will be disposed at a generally low point and also spaced laterally from the end of runway 14 or tube 29. Bowls 27 and 28 preferably are round but have upwardly diverging sides which may be straight or curved, as shown, and may be mounted on special blocks, such as block 31 of Fig. 3, although it will be understood that the bowls may be made integral with the mounting blocks. The mounting blocks may be attached to the receptacles, on the inside thereof, it being understood that the mounting blocks should not extend past the edge of hole 30 and that the mounting blocks may be equal in width to the inside of the receptacles to insure easier positioning of the bowls accurately and to permit small nails to be driven into the blocks from the outside of the receptacles, or the blocks to be glued or otherwise adhesively attached to the receptacles. Guide tube 29 may be attached to the inside of the receptacle 23 by a suitably contoured block 32, as in Fig. 2, and to the standard 20 by a suitably contoured block 33, as in Fig. 1.

As will be evident, the kinetic energy or velocity of the balls, as they leave the runway 14 or guide tube 29, tends to cause the balls to spin around or circle the sides of the bowl 27 or 28 a number of times, before the force of gravity pulls the balls sufficiently close to the bottom of the bowl that they will enter and fall out through hole 30, thereby finally entering the receptacle 22 or 23. From the receptacle 22 the smaller balls 16 may be picked up by the child and replaced in the upper runway 10, while the larger balls 17 may be picked up, as by another child, from receptacle 23 and replaced in the upper runway.

The inclination of lower runway 14 for the smaller balls, and the inclination of guide tube 29 for the larger balls, may be varied so that substantially the same or different periods of time will be required for the balls to reach the respective receptacles. Generally, when one child is positioned at one side of the device and another child at the opposite side, the smaller balls will be placed toward the lower end of upper runway 10 and the larger balls toward the upper end thereof, so that the larger balls will normally be required to move further along the runway 10 than the smaller balls. Thus, the guide tube 29 may be shorter than lower runway 14 and be inclined at a greater angle, so that the larger balls will require a compensating shorter period of time to enter the receptacle 23 after leaving runway 13, when substantially equal periods of time for both large and small balls is desired. Of course, the device is also interesting to one child, since the smaller and larger balls may be picked up alternately, or a number of balls placed in upper runway 10 simultaneously or held therein until a number are assembled, for simultaneous release.

The material of which the educational device of this invention is made may be varied considerably. Although the device may be made of metal, it is well adapted to be made of wood or plastic, with each of the parts a single piece, or more than one part combined into a single piece. The standards 19 and 20, base 21, runways 10 et seq., mounting blocks 31, and receptacles 22 and 23 are conveniently made of wood, while the bowls 27 and 28 may be made of either wood or plastic, as desired. The parts may be attached together by nails, screws, or a suitable adhesive such as glue or a plastic adhesive. The tube 29 may be made of wood or plastic, or any other desired material, such as rolled cardboard, and may also be attached directly to the standard 20 and/or receptacle 23 or bowl 28, or, if desired, supported from the discharge end of the runway 13. Also, the tube 29 need not be completely closed, since a piece similar in cross section to the runways may be substituted therefor, although some sort of ring or deflector, as at the upper end, to insure that the balls discharged from the runway 13 will be guided to bowl 28, may be provided.

From the foregoing, it will be evident that the objects of this invention, as hereinbefore set forth, have been obtained to a marked degree. The action of the balls in passing from runway to runway is not only interesting but exciting to the child, while the automatic separation of the balls into larger and smaller balls adds interest. Furthermore, the collection of one size of balls in one receptacle and the collection of another size in the other receptacle, coupled with the necessity for moving the balls from the receptacle to the upper runway in order to keep the balls in motion down the device, enables the child to learn coordination of effort and movement. Furthermore, the provision of a different motion of the balls just prior to being deposited in the receptacle, such as obtained by spinning, introduces an added feature which increases the zest with which the child uses the device. Also, the time which a ball takes in spinning around the bowl, before finally dropping out of the same, enables another ball to replace the previous balls, so that with only a little effort, a ball may be kept spinning in the bowl at substantially all times. Furthermore, the added pleasure of seeing the balls separate—some going one way and others another way—inculcates a spirit of cooperation between two children or two groups of children utilizing the device. Thus, not only can a child learn better coordination of his own movements and efforts, but also learn coordination and cooperation with others.

Although a specific construction and certain preferred materials, and variations thereof, have been indicated previously, it will be understood that various other changes may be made in both the form and in the materials of construction. Thus, the grooves 15 may be other than U-shaped; additional runways may be utilized by making the standards higher; the means through which the balls pass from one runway to the next may be varied considerably; the number and position of the standards may be varied, as by placing a single standard in the center and providing a cap at the ends of the runways to direct the balls to the next lower runway; and other parts adapted to impart a different motion to the balls than spinning may be utilized, as for instance an oval or other shaped track.

It will therefore be understood that other embodiments may exist, and various changes made therein, all without departing from the spirit and scope of this invention.

What is claimed is:

1. An educational device comprising a pair of upright standards each having a rectangular, longitudinal groove facing the opposite standard; a series of rectangular runways having longitudinal U-shaped grooves to permit more than one size of ball to roll therealong, said runways being alternately inclined with the ends thereof in said standard grooves and the lower end of one runway immediately above the upper end of the runway next below, the two lowest runways extending through the respective standards in opposite directions and said standards being provided with slots for such extension, the next to lowest runway being provided adjacent its lower end with a hole of a size to permit smaller balls to drop through into the lowest runway and larger balls to pass over said hole, and each runway above the lowest two runways being provided with a slot at its lower end through which balls will drop onto the upper end of the runway next below, said standard grooves guiding said balls into such runway next below; a first collection receptacle for smaller balls attached to one of said standards on the outside thereof and beneath the extending lower end of the lowermost runway; a second collection receptacle for larger balls attached to the opposite standard on the outside thereof and below the extending lower end of the next to lowest runway, one end of said second receptacle being spaced from a point immediately below such extending runway end; a first spinning bowl mounted in said first receptacle with its axis tipped and one side substantially tangential to the path of balls emerging from said lowermost runway, said first receptacle having a hole adjacent the lowest point of the interior thereof through which smaller balls may pass into said first receptacle after spinning; a second spinning bowl mounted in said second receptacle at said spaced end and also with its axis tipped and having a hole adjacent the lowest point of the interior thereof through which larger balls may pass into said second receptacle after spinning, the hole in each of said spinning bowls being spaced from the point at which balls enter said bowls; and an inclined guide tube having its upper end beneath the extending end of said second lowest runway and its lower end at the inner side of said second spinning bowl and generally tangential thereto.

2. An educational device as defined in claim 1, wherein the uppermost and lowermost runways are inclined at a greater angle than the intermediate runways, and said guide tube is inclined at a greater angle than said upper and lowermost runways.

3. An educational device comprising a series of alternately inclined runways disposed in vertical relation, the lower end of one runway connecting with the upper end of the next lower runway and said runways being constructed to permit more than one size of ball to roll down the same; means disposed at a lower runway for separating said balls according to size, such separation being between larger balls and smaller balls; separate means including bowl-shaped members tipped from a vertical axis for producing a motion other than a generally straight line motion to larger balls and to smaller balls, respectively, said separate motion means being disposed at spaced positions; means for guiding larger balls from said separating means to said motion means for larger balls; means for guiding smaller balls from said separating means to said motion means for smaller balls; and spaced separate collecting means constructed and arranged to receive the respective larger and smaller balls directly from the respective motion means.

4. An educational device comprising a series of alternately inclined runways disposed in vertical relation, the lower end of one runway connecting with the upper end of the next lower runway and said runways being constructed to permit more than one size of ball to roll down the same, said runway next above the lowermost runway having a hole in the bottom thereof and said hole being of a size through which smaller balls will drop but larger balls will pass over for separating said balls according to size; separate means for producing a motion other than a generally straight line motion to larger balls and to smaller balls, respectively, said separate motion means being disposed at spaced positions; means for guiding larger balls from said runway next above the lowermost runway to said motion means for larger balls; means for guiding smaller balls from said lowermost runway to said motion means for smaller balls; and spaced separate collecting means constructed and arranged to receive the respective larger and smaller balls directly from the respective motion means.

5. An educational device as defined in claim 3, wherein each said bowl shaped member is provided with a hole in the lower portion thereof through which said balls pass to the respective collecting means.

6. An educational device comprising a pair of upright standards each having a rectangular, longitudinal groove facing the opposite standard; a series of five rectangular runways having longitudinal U-shaped grooves to permit more than one size of ball to roll therealong, said runways being alternately inclined with the ends thereof in said standard grooves and the lower end of one runway immediately above the upper end of the runway next below, the uppermost and lowermost runways being inclined at an angle of 8° to 10° to the horizontal and the intermediate runways being inclined at an angle of 2° to 4°, the two lowest runways extending through the respective standards in opposite directions and said standards being provided with slots for such extension, the next to lowest runway being provided adjacent its lower end with a hole of a size to permit smaller balls to drop through into the lowest runway and larger balls to pass over said hole, and each runway above the lowest two runways being provided with a slot at its lower end through which balls will drop onto the upper end of the runway next below, said standard grooves guiding said balls into such runway next below; a first rectangular collection receptacle for smaller balls and having upstanding walls, said first receptacle being attached to one of said standards on the outside thereof and beneath the extending lower end of the lowermost runway; a second rectangular collection receptacle for larger balls and having upstanding walls, said second receptacle being attached to the opposite standard on the outside thereof and below the extending lower end of the next lowest runway, one end of said second receptacle being spaced from a point immediately below such extending runway end; a first generally circular spinning bowl having sides flaring outwardly and upwardly and mounted in said first receptacle with its axis tipped and one side substantially tangential to the path of balls emerging from said lowermost runway, said first receptacle having a hole adjacent the lowest point of the interior thereof through which smaller balls may pass into said first receptacle after spinning; a second generally circular spinning bowl having sides flaring outwardly and upwardly and mounted in said second receptacle at said spaced end and also with its axis tipped and having a hole adjacent the lowest point of the interior thereof through which larger balls may pass into said second receptacle after spinning, the hole in each of said spinning bowls being spaced from the point at which balls enter said bowls; a guide tube inclined at an angle of approximately 45° to the horizontal and having its upper end beneath the extending end of said second lowest runway and its lower end at the inner side of said second spinning bowl and generally tangential thereto; blocks in the respective receptacles, attached thereto and extending across the full width thereof for mounting said bowls in said receptacles; and blocks formed to fit said guide tube for attaching the same adjacent its upper end to one of said standards and adjacent its lower end to the inside of the larger ball receptacle.

References Cited in the file of this patent

UNITED STATES PATENTS

| Number | Name | Date |
|---|---|---|
| 326,078 | Wood | Sept. 8, 1885 |
| 1,068,782 | Kohler | July 29, 1913 |
| 1,314,623 | Wagner | Sept. 2, 1919 |
| 2,236,536 | Hilton | Apr. 1, 1941 |
| 2,239,030 | Biddle | Apr. 22, 1941 |
| 2,492,462 | Caesar | Dec. 27, 1949 |
| 2,515,346 | Jackson | July 18, 1950 |
| 2,522,133 | Sanders | Sept. 12, 1950 |